May 16, 1961   J. A. GREGOIRE   2,984,475
SUSPENSION OF VEHICLES
Filed June 14, 1956   3 Sheets-Sheet 1

INVENTOR
Jean Albert GREGOIRE
By
Mead, Browne, Schuyler & Beveridge

ATTORNEYS

May 16, 1961  J. A. GREGOIRE  2,984,475
SUSPENSION OF VEHICLES
Filed June 14, 1956   3 Sheets-Sheet 2

INVENTOR
Jean Albert GREGOIRE
By
Mead, Browne, Schuyler & Beveridge
ATTORNEYS

May 16, 1961 J. A. GREGOIRE 2,984,475
SUSPENSION OF VEHICLES
Filed June 14, 1956 3 Sheets-Sheet 3

INVENTOR
Jean Albert GREGOIRE
By
Mead, Browne, Schuyler & Beveridge
ATTORNEYS

United States Patent Office 2,984,475
Patented May 16, 1961

2,984,475
SUSPENSION OF VEHICLES
Jean Albert Gregoire, 92 Ave. Niel, Paris, France
Filed June 14, 1956, Ser. No. 591,434
Claims priority, application France June 15, 1955
6 Claims. (Cl. 267—31)

My invention has for its object improvements in the suspension of all types of vehicles and chiefly of automobiles. It is a well known fact that, with a view to obtaining the greatest comfort in automobile and the like vehicles, it is necessary for the frequency of oscillation of the suspension system to be held within certain limits, say 60 to 90 oscillations per minute.

Now, the frequency of oscillation per minute of a suspension is given by the following approximate formula:

$$F = 30\sqrt{\frac{R}{P}}$$

where P designates the suspended weight in kg. and R the rate or rigidity of the suspension, i.e. an amount defined as follows: when the vertical spacing between the suspended section and the non-suspended section of the vehicle is caused to vary as a function of the load of the vehicle, the rate is the ratio between the increase in the load and the associated reduction of said spacing. In other words, it is equal to the derivative of the load with reference to the above-mentioned spacing between said two parts for the position considered.

The above formula shows that, when it is desired to maintain a same grade of comfort for all possible static loads on a given vehicle, it is necessary for the rate of the suspension to vary as a function of the load in a manner such that the frequency F may remain as constant as possible within the above described limits; in other words, said rigidity should vary as a matter of fact in a manner substantially proportional to the load.

Now, the suspensions of the usual spring type have generally constant rates. Consequently, such conventional suspensions cannot provide the same desired comfort for all the loads which are to be carried by the vehicle and therefore they are too "hard" when unloaded or slack at full load.

It has also been attempted to produce pneumatic suspensions, i.e. suspensions wherein the springs are replaced by a capacity containing compressed air and the volume of which varies with the static or dynamic load of the vehicle, said capacity being constituted by bags, bellows or the like or again by a piston and cylinder system. Such suspensions have variable rates but the rate varies in such cases too speedily with the load at least when it is attempted to reduce such suspension within a suitably small bulk and thus the drawback which is met is the reverse of that met with spring suspensions and the frequency F is as a matter of fact much higher under load than in the absence of any load and therefore, it is again impossible to provide the desired comfort for all the loads to which the vehicle may be subjected and such suspensions are generally too slack when the vehicle is not loaded and too hard under load.

My invention has for its object to remove such drawbacks and to allow the execution of suspensions the frequency of oscillation of which remains as constant as possible within the above defined limits whatever may be the static load on the vehicle.

My invention has for its further object the execution of such suspensions which are of a reduced cost price and require no special upkeep or adjustment.

According to a still further object of my invention, I provide particularly silent suspensions forming per se an elastic abutment which prevents a harsh impact between the body of the vehicle and the stationary stop limiting the movement of said body when the vehicle passes under full load over an uneven ground for instance.

My invention has lastly for its object the execution of suspensions of the type referred to, wherein the pneumatic element is associated with a conventional shock absorber.

These results are obtained in conformity with my invention through the fact that the suspension for each wheel or set of wheels is constituted by mechanical means incorporating a spring such as a coil spring, a semi-elliptic spring, a torsion bar or a rubber member for instance, the rate of which is practically constant or varies very little, in association with pneumatic means having a highly variable rate and designed in a manner such that the rate of the complete suspension which is equal to the sum of the rates of the two elements varies in a substantially linear manner with the load. The pneumatic means may be constituted in any suitable manner, for instance by a piston and cylinder system or else by a compressible bag shaped accordionwise, bellows or the like, said piston and cylinder system, bag, bellows or the like being preferably fitted directly between the suspended and non-suspended section of the vehicles.

It has already been proposed to execute suspensions through the association of an elastic spring-incorporating arrangement with pneumatic means. But the arrangements of this type which have been precedingly proposed are not designed in a manner such that the rate may vary in accordance with a substantially linear law and therefore, such prior known arrangements do not lead to the result I have sought for.

According to a preferred embodiment of my invention, the pneumatic arrangement which should be as fluidtight as possible is subjected to a pressure which is equal or substantially equal to atmospheric pressure for a so-called completely empty vehicle, i.e. when the vehicle rests on its wheels through the agency of the suspension without carrying any luggage, driver or passengers.

The constant rate suspension section is designed in such an embodiment so as to carry substantially the entire weight of the vehicle when in its completely empty position, the pneumatic means carrying then no load in said position and carrying a gradually increasing fraction of said load as said load increases.

On the other hand, the pneumatic means are designed preferably so that when the body of the vehicle is shifted to a minimum distance from the wheels, said pneumatic means are sufficiently compressed so as to form a pneumatic abutment.

Furthermore, the pneumatic means may be incorporated in a hydraulic damping shock absorber, which latter is then provided with a variable capacity air-filled chamber, which chamber forms the actual pneumatic suspension means cooperating with the elastic suspension section so as to produce the desired result.

In all cases, the pneumatic means should preferably, in order to satisfy the conditions of operation required therefor, show the features disclosed in the following description of a preferred embodiment illustrated by way of example in the accompanying drawings. In said drawings illustrating by way of exemplification such embodiments of my invention:

Fig. 2 shows said cylinder and piston for the loaded position of the vehicle and Fig. 3 shows them for the completely empty position of the vehicle, which is that illustrated in Fig. 1.

Figure 1:
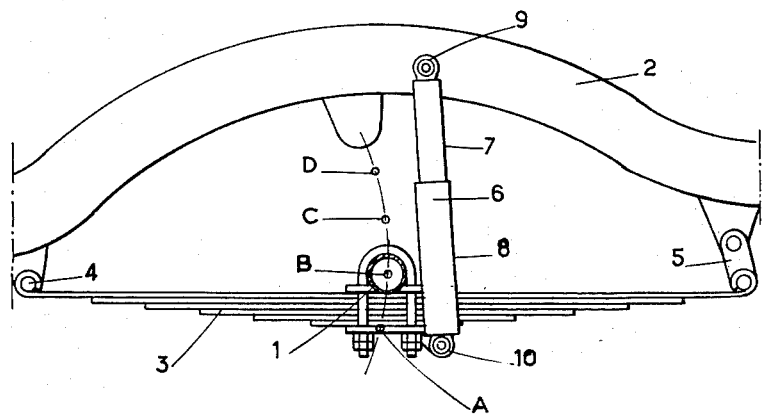
Fig. 1 is a diagrammatic partly sectional elevational view of a first arrangement according to my invention, constituted by the combination of a semi-elliptic spring with pneumatic means constituted by a shock absorber of the piston and cylinder type.

Turning to Fig. 1, 1 designates the axle of a vehicle and 2 the girder of the vehicle chassis. The connection between said two elements and the suspension formed thereby are obtained in accordance with my invention through the combination of a semi-elliptic spring connected with the chassis through a pivotal connection 4 at one end and of shackles 5 at the other end with a pneumatic arrangement 6 incorporated in a hydraulic shock absorber.

The said pneumatic arrangement includes two cylinders 7 and 8 closed at their outer ends and slidingly engaging and opening into each other; the upper cylinder 7 is pivotally connected with the suspended section of the vehicle through the ring 9 which may be provided with an elastic-cushioning member or with a rotula. The lower cylinder 8 caps the lower end of the cylinder 7 and is pivotally secured to the non suspended section of the vehicle through a ring 10 which is also provided with an elastic cushioning member or with a rotula. These pivotal connections may be of any conventional type generally resorted to for mounting hydraulic shock absorbers, but with a slightly increased strength by reason of the part played by them in the suspension.

Figure 3:
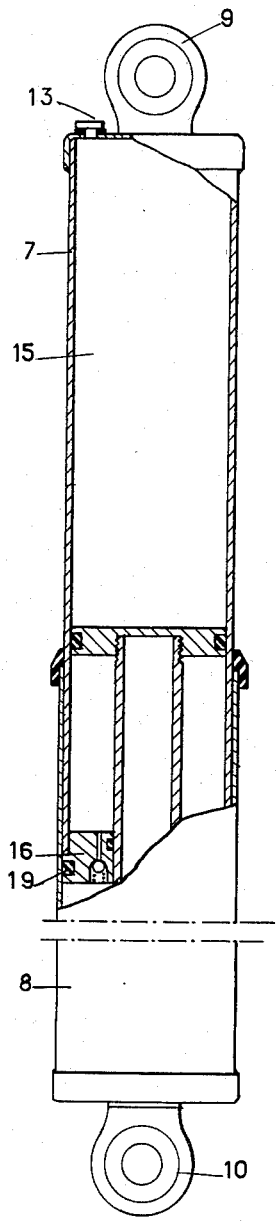
Figs. 2 and 3 are separate sectional views on a larger scale of the pneumatic piston and cylinder system incorporated in the shock absorber.
Figure 2:
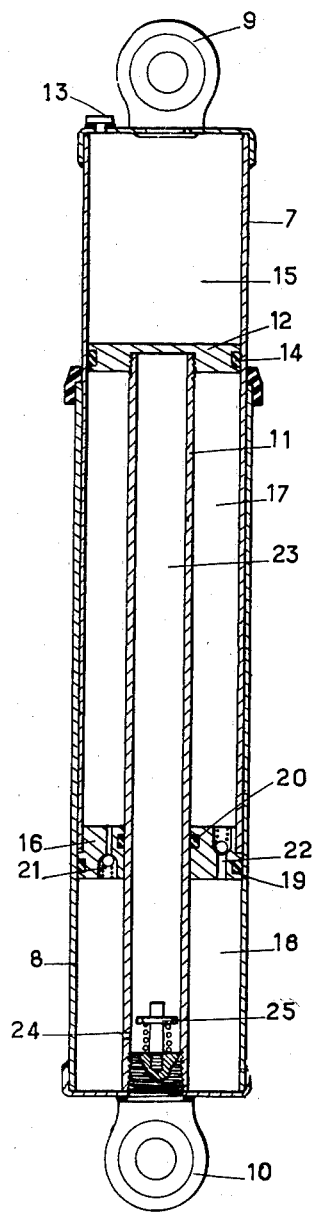

Turning now more particularly to Figs. 2 and 3, there is secured to the lower cylinder 8 and axially thereof a hollow rod 11 carrying in its turn at its upper end a piston 12 sliding inside the upper cylinder 7. Said upper cylinder is provided at a suitable point of its cover with an opening closed by a fluid tight lug 13. Furthermore, a packing 14 provides for fluid tightness between the capacity 15 left free in the stop of the cylinder 7 by the piston 12.

Said cylinder and piston arrangement 7–12 forms the pneumatic section of the suspension which cooperates with the spring 3 in accordance with my invention so as to produce the result disclosed hereinafter. The parts located underneath the piston 12 and inside the cylinder 8 form a conventional shock absorber.

This shock absorber is constituted as follows: the cylinder 7 is closed at its lower end by a wall 16 provided with a central opening for the passage of the tubular rod 11 of the piston. The wall 16 may for instance be screwed into the lower end of the cylinder 7. Said wall 16 subdivides the space defined by the two cylinders underneath the piston 12 into two compartments 17 and 18 containing oil or any other suitable liquid.

The fluid tightness of the upper compartment 17 with reference to the compartment 15 is provided by the packing 14 while the fluid tightness of the lower compartment 18 is provided with reference to the said compartment 17 by means of the packing 19 at the outer periphery of the partition 16 engaging the wall of the cylinder 8 and by a further packing 20 fitted between said partition 16 and the rod 11.

On the other hand, the passage of oil between the chamber 17 and the chamber 18 is allowed by the gauged port 21 provided with check valves for the flow of liquid from the compartment 17 towards the compartment 18 and by similar ports 22 for the reverse flow of liquid.

Preferably the ports 22 should have a large cross-sectional area so as to brake to an only restricted extent the passage of the liquid when the non-suspended section of the vehicle moves towards the suspended section of the vehicle.

In contradistinction, the ports 21 should be comparatively small so as to produce the desired damping action when the non-suspended section of the vehicle moves away from the suspended section.

The bore 23 in the hollow rod 11 forms a chamber compensating the volume of the wall of the cylinder 7 entering the oil and to this end one or more openings 24 are provided in the lower end of the wall of said rod 11.

When the rings 9 and 10 have been spaced to a maximum, the bore or chamber 23 contains a column of air which is substantially under atmospheric pressure and the volume of which is higher than the volume of oil displaced by the wall of the cylinder 7 when the rings 9 and 10 are spaced by a minimum distance.

A check valve 25 may be provided in the tubular chamber 23 so as to allow the liquid to pass through the ports 22 before the oil enters the chamber 23. It is in fact possible to associate the check valve 25 with any suitable anti-emulsion means.

It will be readily ascertained that the arrangement described operates in the same manner as a conventional double acting shock absorber.

The said arrangement operates also as the pneumatic part of the suspension in combination with the blade spring 3. This will be readily apparent by considering the successive positions assumed by the axle 1 with reference to the girder 2, said positions being:

(A) corresponding to the position occupied when the suspended section of the vehicle rests on a jack.

(B) corresponding to the position of the completely empty vehicle resting on its wheels.

(C) corresponding to a fully loaded position.

(D) corresponding to the position for which the axle engages dynamically an elastic abutment adapted to prevent any metal contact between the axle and the girders in the case of a violent shock.

When the axle assumes its extreme position A, the piston 12 should not be in contact with the partition 16 and a clearance of a few millimeters should be ensured so as to avoid any speedy damage to the shock absorber.

On the other hand, when the axle is in its position D, the distance between the piston and the bottom of the cylinder should be held within the limits to be disclosed hereinafter.

According to my invention, the air contained inside the upper chamber 15 is introduced for instance at atmospheric pressure through the plug 13 for a position of the piston 12 corresponding to the position B of the axle or a position approximating same.

Under such conditions and if, in conformity with the invention, the different structural data of the suspension i.e. the characteristic features of the spring on the one hand and the size of the piston and cylinder system, have been suitably selected, for instance in accordance with the method to be disclosed hereinafter, the suspension obtained will operate under substantially uniform and excellent conditions of comfort whatever may be the load carried by the vehicle.

I will first disclose the theoretical principles which allow ascertaining the characteristic data of a suspension constituted by the association of a pneumatic system such as a cylinder and a piston with an elastic arrangement constituted for instance by leaf-spring, particularly with a view to defining the frequency of oscillation of such a suspension. It has been shown hereinabove that this frequency is substantially equal to $$30\sqrt{\frac{R}{P}}$$

R designating the rate or rigidity of the system and P the load to which said suspension is subjected. It is a well known fact that when two such suspension means are arranged in parallel relationship as in the present case, the total load to which the suspension is subjected is equal to the sum of the load assumed by each component of the suspension and the total rate of the system is equal to the sum of the rates of the component of the suspension. The rate of the spring blade component is constant. In contradistinction, and as mentioned hereinabove, the rate of the pneumatic arrangement is variable.

In order to estimate approximately the static load to which the pneumatic element is subjected, it should be assumed that the air enclosed inside the capacity 15 follows Boyle's law:

$$p.v. = \text{constant}$$

$p$ being the pressure of the air and $v$ the volume of the air inside the capacity referred to. This is true as a matter of fact in the case of the slow practically isothermic movements of the suspension considered as a whole.

In contradistinction, for estimating the rate of this pneumatic component with a view to defining its frequency of oscillation, it will be assumed that the air enclosed inside said component is subjected under the action of shocks for instance to oscillations and consequently to modifications in volume and in pressure which are comparatively rapid. In other words, the modifications in pressure and in volume follow then a substantially adiabatic law and instead of $p.v. = \text{constant}$, the law to be considered is:

$$p.v.^\gamma = \text{constant}$$

$\gamma$ being a coefficient equal to about 1.4.

Under such conditions, if we designate by $y$ the shifting, i.e. the modification in the vertical distance of the suspended section of the vehicle with reference to the non-suspended section, which is obtained between the completely empty position of the vehicle and any static load conditions, by S the cross-section of the piston in the cylinder and piston arrangement, and if we consider furthermore that L is the quotient of the volume of air contained inside the cylinder under atmospheric pressure and for conditions corresponding to a completely empty vehicle, divided by the cross-sectional area of the piston, which corresponds in the case of a perfectly cylindrical volume to the actual length of the cylinder for the pressure considered, while $Ky$ designates furthermore the rate of such an arrangement for the load considered, i.e. for the value $y$ to be considered, the following equation is true:

$$Ky = \frac{SL\gamma}{(L-y)^2} \quad (2)$$

This formula and also the following formula have been established by assuming for the atmospheric pressure an approximate value equal to 1 kg./sq. cm., said approximation being sufficient for practical purposes.

On the other hand, and as already mentioned, the rate of the main spring $K_r$ is constant.

Now, if we designate by $P_B$ the load borne by the suspension when the vehicle is completely empty, which load is obviously carried solely in such a case by the spring, the load $P_r$ to which the spring is subjected will be equal to $$P_r = P_B + K_r \times y \quad (3)$$

and the load to which the pneumatic arrangement is subjected to will be:

$$P_y = \frac{S \times y}{L - y} \quad (4)$$

The formula defining the frequency is consequently:

$$30 \sqrt{\frac{\frac{SL\gamma}{(L-y)^2} + K_r}{P_B + K_r y + \frac{Sy}{L-y}}} \quad (5)$$

and said frequency is thus correctly defined by the characteristic properties of the spring and of the pneumatic arrangement. It is thus necessary to keep said amount at a substantially constant value. To this end, a simple method consists in writing that the amount considered has the same value for conditions corresponding to a completely empty vehicle and to a normally loaded vehicle. If said equality is obtained, experience shows that in practice, the frequency will remain substantially unvarying throughout the intermediate positions between the said positions corresponding to a completely empty vehicle and to a normally loaded vehicle and even for positions corresponding to loads substantially higher than normal load. A method for calculating the data will therefore consist in selecting the data for the components of the suspension in a manner such that said equality may be obtained.

It should be first remarked that certain data are given by the actual nature of the vehicle. This is the case in particular for the weight of the empty vehicle $P_B$ and its weight when loaded $P_C$ and also for the desired comfort defined by the frequency of oscillation $n$.

To these parameters, it is essential to associate the dynamic load $P_D$ reached during operation; said dynamic load corresponds to the weight which should be applied to the suspended section of the vehicle for said suspended section to engage the abutment on the suspension means. To this dynamic load, there corresponds a so-called dynamic coefficient which is the ratio between the dynamic load and the maximum normal load of the vehicle. The dynamic load and the dynamic coefficient are parameters to be defined before any reckoning and this dynamic coefficient ranges generally between 1.3 and 2.

Under such conditions, if it were possible to execute an ideal suspension, the frequency of which is perfectly constant at all loads, these data defined before any reckoning would be sufficient for defining the other data of the suspension such as: the shifting or difference in level H obtained between the completely empty vehicle conditions and the abutment conditions for the suspension means. Said value H is given by the following formula:

$$H = \left(\frac{30}{n}\right)^2 \text{Log}\left(\frac{P_D}{P_B}\right) \quad (6)$$

(Log designating a natural logarithm)

When calculating a practical suspension in accordance with my invention, it is possible starting from the above predetermined data to select for H the value thus calculated for an ideal suspension. Experience shows as a matter of fact that the frequency obtained is in this case and for a suspension according to the invention substantially equal to that of an ideal suspension.

It is now necessary to define the variations of the shifting $h$ when the vehicle passes from completely empty conditions to fully loaded conditions. This is done by calculating the shifting $h'$ which would be obtained in the ideal system defined hereinabove, through the following formula:

$$h' = \left(\frac{30}{n}\right)^2 \log\left(\frac{P_C}{P_B}\right) \quad (7)$$

$h$ being then defined by the formula:

$$h = h' \times a$$

$a$ being an experimental coefficient ranging between 1.2 and 1.5. As long as $h$ remains within such limits, the suspension may be designed so as to show the best properties.

These various data being obtained, it is possible to calculate the structural features of the spring and of the pneumatic section of the suspension, which features may be selected between predetermined limits.

In the first place, I select the length L of the pneumatic component. Said length L should obviously be higher than the length H, failing which the volume of the cylinder should become zero for abutment conditions which is obviously impossible. In practice, experience has shown and this forms one of the features of the invention that L should be equal to $H \times b$ while $b$ ranges between 1.1 and 1.3, which corresponds to a residual volume for abutment conditions which is comparatively small and consequently to a pressure of air inside the pneumatic component which ranges between 4.3 and 11 atmospheres, for abutment conditions. This being considered, the above requirement for equality in the oscillation frequencies for conditions corresponding to an empty vehicle and to a loaded vehicle is given out by the formula $$L(L-h)^2(P_C-P_B)^2 - SLh(P_C-P_B)(L-h) + \gamma ShP_C(L-h)^2 - ShP_BL^2\gamma = 0 \quad (8)$$

which allows defining the area S of the piston in the pneumatic suspension section.

According to the selection made within the range 1.1 to 1.3 of the coefficient $$b = \frac{L}{H}$$

it is possible to obtain for the surface S values which diverge to a substantial extent. Experience has shown that for structural reasons and in contradistinction with any previous expectation, it is essential for said surface S to be comparatively small with reference to the length L. This is ascribable to the fact that the rate of the pneumatic section under conditions corresponding to a completely empty vehicle is proportional to said surface since it is equal to $$\frac{S\gamma}{L}$$

as apparent from inspection of the above Formula 2. Now, the constant rate $R_r$ of the spring is equal to the difference between the total rate of the system for empty vehicle conditions as defined by the Formula 1 and the rate of the pneumatic section. The greater the value of S, the smaller the rate of the spring section should be. Now, for structural reasons, the spring should not assume a rate which is too low and in practice the rate of the pneumatic section under empty vehicle conditions should be at the utmost equal to 25% of the rate of the whole suspension and, generally speaking, it should be still much lower.

This corresponds to the selection for S of a comparatively small value and in practice if $d$ designates the diameter corresponding to said surface S, it is necessary in all cases to choose a value of L above 1.5$d$ and preferably $\gamma$ above 2$d$. Under such conditions, if the selection of the coefficient $b$ leads to obtaining a value of S which is too high, it is necessary to correct the calculation made by modifying the value of said coefficient with a view to satisfying the above conditions.

The fact of selecting for L a value above 2$d$ allows furthermore obtaining pneumatic suspension sections the size of which corresponds to that of conventional hydraulic shock-absorbers.

I will disclose now by way of example and by no means in a limiting sense the manner of calculating the data for a suspension according to my invention.

Assuming it is desired to provide for the suspension of the rear wheels of a touring car, the total weight of which car, when empty, is equal to 1,100 kg., the suspended weight per wheel for the position B corresponding to a completely empty vehicle being equal to 260 kg., for the full load position C to 410 kg. and for the abutting position D to 575 kg., and in the case of the ideal suspension referred to hereinabove wherein the constant frequency sought for is equal to 80 oscillations per minute, the vertical shifting H between B and D given by the Formula 6 would be equal to 11.2 cm. By selecting values $a=1.25$ and $b=1.2$, I obtain $h=8$ cm. and $L=13.4$ cm.

Lastly, the rate of the pneumatic means for completely empty conditions are calculated and this leads to the obtention of the value $K_r$ of the constant rate of the spring, which is 1.65 kg./mm. I obtain thus all the data relating to the suspension. Experience shows that the frequency of oscillation remains approximately equal to 80 or thereabouts for all the values of the load ranging between completely empty conditions and full load conditions.

For a conventional suspension dealing with the same data as concerns the weight of the vehicle when empty, to wit the same load, the same dynamic coefficient and the same vertical shifting between the empty vehicle conditions B and the abutment conditions D, I obtain the following results: frequency when empty 98.5 and under load 78.5

Compared with the results of the preceding example, the advantages of my improved suspension are immediately apparent.

It is obviously possible to resort to any other method for calculating such data. However, it is not necessary, as mentioned hereinabove, to provide for perfect equality between the frequencies under empty vehicle conditions and under full load conditions. It is sufficient to obtain approximate equality in this case, so that for the application of the formula 1 may simply write that there is substantial equally of frequency for conditions corresponding respectively to a completely empty vehicle and to a vehicle under load.

Figure 4:
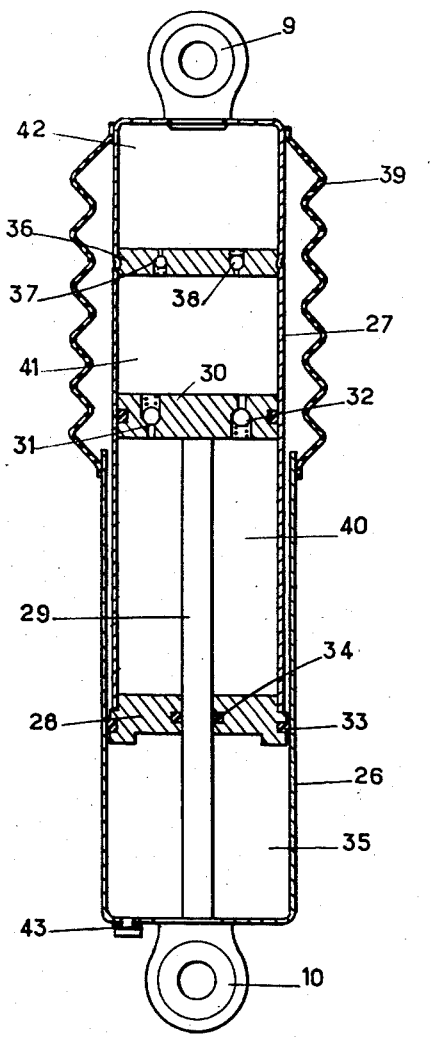
Fig. 4 shows a modification of the system illustrated in Figs. 2 and 3.

Fig. 4 is a cross-sectional view similar to that of Fig. 2 showing, as already mentioned, a modification of the arrangement illustrated in said Fig. 2. In said figure, the pneumatic suspension section associated with the shock absorber forms a system comprising the two cylinders 26 and 27 which are closed at the outer ends while they open towards and fit inside each other, the cylinder 27 sliding inside the cylinder 26. At its lower end, the upper cylinder 27 is closed by a partition or cover 28 which is axially apertured so as to provide for the sliding therethrough of a rod 29 secured to the lower end of the cylinder 26, which rod carries at its end opposed to said lower cover a piston 30 provided as in the preceding embodiment with flap valves 31 and 32 for the flow of the damping liquid in both directions.

The partition or cover 28 is provided with inner and outer packings 34 and 33 which provide for the fluid-tightness between the pneumatic chamber 35 formed in the cylinder 26 on the one hand and the partition 28 on the other hand.

A further partition 36 extends across the inside of the cylinder 27 and is provided with flap valves 37 and 38 while bellows 39 are adapted to prevent the entrance of any dust into the interval between the interengaging cylinders 26 and 27.

The compartments 40 and 41 defined respectively between the partition 28 and the piston 30 on the one hand and the partition 36 and said piston 30 on the other hand are filled with the damping liquid, while the compartment 42 located above the partition 36 forms a chamber enclosing a volume of gases compensating the varying volume of the fraction of the rod 29 moving inside said compartment 40. The whole arrangement lying above the partition 28 acts in the same manner as a conventional shock-absorber.

In contradistinction, the chamber 35 is filled with air which is fed into it through an opening closed by a plug 43, said air being fed under atmospheric pressure when the arrangement is in its completely empty vehicle conditions. This air chamber forms the pneumatic section of the suspension. The operation of the whole arrangement is similar to that described with reference to Fig. 2.

Figure 5:
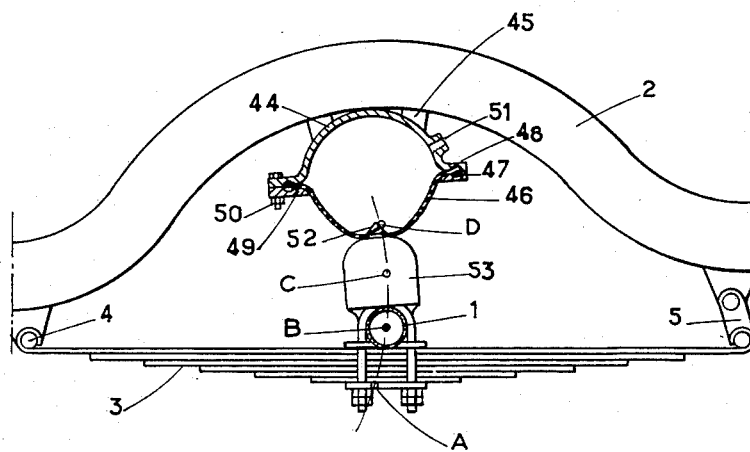
Fig. 5 is a view corresponding to Fig. 1 of a further embodiment of the invention constituted by the association of a semi-elliptic spring with pneumatic means constituted by a deformable capacity.

Turning to Fig. 5, the latter shows, as disclosed, suspension means according to my invention, wherein the pneumatic section is constituted by a deformable fluid-tight chamber carried by the girder cooperating with an abutment mounted on the axle. In said figure, as in the case of Fig. 1, 1 designates the axle, 2 the girder, 3 a leaf spring pivotally secured at 4 to the girder through one end while its other end is pivotally secured to said girder through shackles 5.

In said Figure 5, the deformable capacity is constituted by a hemispherical member 44 made of metal for instance and secured through lugs 45 to the girder 2, said member 44 cooperating with a substantially hemispherical diaphragm 46 made of any suitable deformable material such as rubber, the connection between the diaphragm 46 and the member 44 being provided through the fact that said diaphragm 46 includes flanges 47 which are held fast between a flange 48 on the hemispherical member 44 and a ring 49 secured to said flange 48 by the bolts 50, the system being fitted in position in a manner such that the fluid tightness of the chamber defined between the diaphragm and the member 44 may remain as high as possible. A plug 51 is screwed into a corresponding opening of the hemispherical member 44 so as to provide, if required, for communication between the inside of the chamber and the atmosphere. The diaphragm 46 is provided furthermore on the inside of its central section with a bulging part 52 adapted to form an abutment as disclosed hereinafter. The abutment 53 constituted by a metal body is secured directly to the axle and its shape is that illustrated. The whole arrangement is such that, in accordance with the invention, the abutment 53 engages, when the vehicle is completely empty, the surface of the part 52 of the diaphragm 46 without exerting any substantial pressure on the latter.

The arrangement described operates as follows: the system assuming the position corresponding to a completely empty vehicle, which is that illustrated, the pressure inside the chamber 44—46 is equal to atmospheric pressure. As the vehicle is loaded, the abutment 53 engages more and more the diaphragm 46 so as to compress gradually the air enclosed within said chamber 44—46, which acts thus similarly to the pneumatic section constituted in the preceding embodiment by a piston and cylinder system. In said Fig. 5, the points A, B, C, D illustrate as precedingly the locations of the axis of the axle for different loads:

(A) position for the maximum shifting of the suspended section of the vehicle.

(B) position for the completely empty position of the vehicle.

(C) position under load.

(D) position for abutment under dynamic conditions between the suspended and non-suspended sections of the vehicle.

For the abutment position, the bulging part 52 of the diaphragm impinges against the opposite wall of the member 44 so as to provide for an actual positive abutment.

The structural data for such a suspension are defined in a manner which differs substantially from that of the elements of a suspension of the piston and cylinder type according to the preceding embodiment. However, as a first approximation, it is possible to consider said suspension as incorporating a piston and cylinder system wherein the diameter of the piston assumes a value comprised between that of the abutment 53 and that of the diameter of the diaphragm 46. The manners of reckoning the data are similar for both embodiments disclosed.

It should be remarked however that in such a case the above described conditions relating to the ratio $L/d$, $d$ forming in this case the theoretical diameter referred to hereinabove, are no longer applicable. As a matter of fact, in the present case, the rate of the pneumatic section for the conditions corresponding to an empty vehicle is no longer defined by the diameter of the piston, since in the position corresponding to such empty vehicle conditions as defined hereinabove, the abutment 52 engages the diaphragm 46 only through a very small contacting area which is almost zero so that the rate of said pneumatic means is extremely small.

It is possible of course to bring numerous modifications to the embodiments described without widening the scope of the invention as claimed in the accompanying claims.

In the case of the embodiment resorting to a cylinder and piston system incorporated in a shock absorber, it is of course possible to use any shock absorber instead of those described with reference to the accompanying drawings. If required, it is possible instead of a simple piston and cylinder system to provide two or more systems arranged in parallelism and the diameters of which are necessarily smaller. It is also possible to substitute a number of springs for the single spring system described.

In the embodiments referred to, the shock absorbers incorporating the pneumatic means were described as vertical and registering with the corresponding wheels. It is obviously possible to give such shock absorbers a sloping position or to locate them at a distance from the corresponding wheels, in which case the modifications in volume of the air-containing capacity are no longer exactly proportional to the vertical shifting of the suspended section of the vehicle and at any rate the coefficient of proportionality is not the same, so that it is necessary for such modifications to provide for a correction to the calculations made.

Furthermore, in the example given of an arrangement including a piston and a cylinder, the residual space left for the compressed air in the position termed as D forms a cylindrical space the diameter of which is equal to that of the piston. Now, it is possible if required to provide a residual space of any other shape, said space being constituted for instance by a capacity located laterally of the cylinder.

In the case where an arrangement with a diaphragm is provided as in the case of Fig. 5, the diaphragm and the projection may be given any suitable shape other than that illustrated. The diaphragm itself may be made of rubber or of elastic material or again of a yielding non elastic material such as rubberized canvas.

The contacting between the abutment and the diaphragm may be obtained either as mentioned hereinabove in the vicinity of completely empty vehicle conditions or again only for a position intermediate between the latter position and the full load position.

Lastly, it should be remarked that in practice the piston and cylinder systems incorporated in shock absorbers or otherwise are chiefly applicable to the case of vehicles subjected to a comparatively small load such as touring cars while the air chamber or diaphragm arrangements are preferably resorted to in all other cases.

What I claim is:

1. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single completely, permanently and fluid tightly closed compressible air chamber, an unvarying mass of air filling said chamber and the pressure of which is equal to atmospheric pressure when the vehicle is in its completely empty condition, the said air spring having a variable rate and an effective area of cross section and normal volume of air so selected that the sum of the rates of the two springs varies in a manner to provide an approximately constant frequency of oscillation between no load and full load conditions.

2. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a single completely, permanently and fluid tightly closed compressible air chamber, an unvarying mass of air filling said chamber, the pressure of which is equal to atmospheric pressure when the vehicle is in its completely empty condition, the said air spring having a variable rate and an effective area of cross-section and normal volume of air so selected that the sum of the rates of the two springs varies in a manner to provide an approximately constant frequency of oscillation between empty and full load conditions, the value of the maximum pressure of the air in the air spring chamber ranging between 4 and 11 kg. per sq. cm. when the suspended part of the vehicle is urged dynamically downwardly beyond the position corresponding to fully loaded vehicle conditions.

3. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a cylinder and a piston sliding inside the cylinder and defining therewith a unitary, completely, permanently and fluidtightly closed air chamber, said piston sliding inside the cylinder under control of the relative movement between the two parts of the vehicle, an unvarying mass of air filling said air chamber and the pressure of which is equal to atmospheric pressure when the vehicle is in its completely empty condition, the said air spring having a variable rate, an effective cross-sectional area and normal volume of air such that the rate of the suspension constituted by the sum of the rates of the two springs varies in a manner to provide substantially constant frequency of oscillation for any load condition between unloaded and full load conditions, the quotient of the volume of air contained in the cylinder of the air spring under atmospheric pressure for completely empty vehicle conditions divided by the cross-sectional area of the air spring being equal to at least 1.5 times the diameter of the piston.

4. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a cylinder and a piston sliding inside the cylinder and defining therewith a unitary, completely, permanently and fluidtightly closed air chamber, said piston sliding inside the cylinder under control of the relative movement between the two parts of the vehicle, an unvarying mass of air filling said air chamber and the pressure of which is equal to atmospheric pressure when the vehicle is in its completely empty condition, the said air spring having a variable rate such that the rate of the suspension constituted by the sum of the rates of the two springs increases in substantial proportionality with the load of the vehicle, the quotient of the volume of air contained in the cylinder of the air spring under atmospheric pressure for completely empty vehicle conditions divided by the cross-sectional area of the piston of the air spring ranging between 1.1 and 1.3 with the length of the maximum vertical shifting between the vehicle parts for positions corresponding respectively to completely empty conditions and to a dynamic sinking of the suspended part into its lowermost position.

5. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a shock absorber comprising two cylinders each having one closed end and slidingly fitted inside each other through their open ends and under the control of the relative shifting between the two vehicle parts, a transverse partition in one cylinder forming between it and the closed bottom of the second cylinder an entirely and permanently fluidtight air chamber, and a ported piston fitted at the outer end of said second cylinder adapted to damp through the passage of fluid through its ports the relative sliding movement between the two cylinders, an unvarying mass of air filling said air chamber and the pressure of which is equal to atmospheric pressure when the vehicle is in its completely empty condition, the said air spring having a variable rate and an effective cross-sectional area such that the rate of the suspension constituted by the sum of the rates of the two springs varies in a manner to provide an approximately constant frequency of oscillation for any load condition between no load condition and full load condition.

6. In a suspension for a vehicle including a wheeled part and a suspended part adapted to assume varying positions with reference to the wheeled part between that corresponding to a completely empty vehicle and that corresponding to a fully loaded vehicle, the combination of two springs inserted between the two parts of the vehicle independently of each other and of which springs one is a mechanical spring and has a substantially constant rate and the other spring is an air spring constituted by a shock absorber including a closed cylindrical body, a piston moving therein under the control of the relative movement between the two parts of the vehicle and a rod controlling the piston and extending through one end of said cylindrical body, a cylindrical cap rigid with the piston rod having a closed end and capping the first cylindrical body and defining with the latter a completely and permanently fluidtight air filled chamber, an unvarying mass of air filling said air-filled chamber and the pressure of which is equal to atmospheric pressure when the vehicle is in its completely empty condition, the said air spring having a variable rate and an effective cross-sectional area such that the rate of the suspension constituted by the sum of the rates of the two springs varies in a manner to provide a substantially constant frequency of oscillation for any load condition.

References Cited in the file of this patent

UNITED STATES PATENTS

| | | |
|---|---|---|
| 1,113,619 | Hammersmith | Oct. 13, 1914 |
| 1,142,162 | Gruss | June 8, 1915 |
| 1,436,144 | Bernat | Nov. 21, 1922 |

(Other references on following page)

UNITED STATES PATENTS

| | | |
|---|---|---|
| 1,641,640 | Myers | Sept. 6, 1927 |
| 1,655,786 | Guerritore | Jan. 10, 1928 |
| 1,886,712 | Messier | Nov. 8, 1932 |
| 1,956,669 | Charles | May 1, 1934 |
| 2,317,057 | Higby | Apr. 20, 1943 |
| 2,361,575 | Thompson | Oct. 31, 1944 |
| 2,531,368 | Tack et al. | Nov. 21, 1950 |
| 2,606,757 | Cairns | Aug. 12, 1952 |
| 2,666,636 | Wulff | Jan. 19, 1954 |

FOREIGN PATENTS

| | | |
|---|---|---|
| 435,361 | Great Britain | Sept. 19, 1935 |